United States Patent [19]

Goldschmidt et al.

[11] Patent Number: 5,125,782

[45] Date of Patent: Jun. 30, 1992

[54] FACILITY FOR STORING ITEMS ALONG PARALLEL CHANNELS

[76] Inventors: Sol Goldschmidt, Katharinenweg 6, CH-8002 Zürich, Switzerland; Michel Ohl, 15, route Flanville, F-57117 Montoy, France

[21] Appl. No.: 543,129

[22] Filed: Jun. 22, 1990

[30] Foreign Application Priority Data

Jun. 22, 1989 [DE] Fed. Rep. of Germany ....... 3920405

[51] Int. Cl.⁵ ............................................. B65G 47/52
[52] U.S. Cl. ................................. 414/276; 198/347.1; 414/278; 414/285
[58] Field of Search ............... 414/276, 277, 278, 279, 414/285, 233, 234, 239, 240; 198/347.1

[56] References Cited

U.S. PATENT DOCUMENTS

| | | | |
|---|---|---|---|
| 1,906,773 | 5/1933 | Scott | 414/233 X |
| 2,874,857 | 2/1959 | Coursey | 414/240 |
| 3,333,714 | 8/1967 | Sermet | 414/239 |
| 3,557,973 | 1/1971 | Bussieanne | 414/279 |
| 3,568,862 | 3/1971 | Walkoff | 414/285 |
| 3,674,159 | 7/1972 | Lemelson | 414/276 |
| 3,738,506 | 6/1973 | Cornford et al. | 414/279 X |
| 3,800,963 | 4/1974 | Holland | 414/279 |
| 3,805,974 | 4/1974 | Andersson et al. | 414/276 |
| 3,876,085 | 4/1975 | Bright | 414/239 |
| 4,383,598 | 5/1983 | Newman | 414/276 X |
| 4,459,078 | 7/1984 | Chiantella | 414/279 |
| 4,715,765 | 12/1987 | Agnoff | 414/276 |
| 4,815,914 | 3/1989 | O'Brien et al. | 414/276 |
| 4,915,240 | 4/1990 | Konstant | 414/276 X |
| 4,915,566 | 4/1990 | van Elten | 414/276 |

FOREIGN PATENT DOCUMENTS

| | | | |
|---|---|---|---|
| 1097120 | 1/1961 | Fed. Rep. of Germany | 414/239 |
| 1434625 | 10/1968 | Fed. Rep. of Germany | 414/240 |
| 2259771 | 6/1974 | Fed. Rep. of Germany | 198/347.1 |
| 59-12001 | 1/1984 | Japan | 414/285 |
| WO/8000690 | 4/1980 | PCT Int'l Appl. | 414/239 |
| WO/8805018 | 7/1988 | PCT Int'l Appl. | 414/279 |
| 2043013 | 10/1980 | United Kingdom | 198/347.1 |

*Primary Examiner*—Robert J. Spar
*Assistant Examiner*—Robert S. Katz
*Attorney, Agent, or Firm*—Peter K. Kontler; Tobiás Lewenstein

[57] ABSTRACT

A warehouse has several levels. Each level has a series of storage channels for items to be stocked in the warehouse. The storage channels are parallel to one another and have respective inlet ends located at a first side of the warehouse and respective outlet ends located at an opposite second side of the warehouse. Each storage channel is equipped with a device for guiding items along the channel in a direction from the inlet end towards the outlet end. Every level is further provided with at least one return channel which is parallel to the storage channels and has an inlet end at the second side of the warehouse and an outlet end at the first side of the warehouse. The return channel is again equipped with a device for guiding items along such channel in a direction from the inlet end to the outlet end thereof. On each level, a reversible first horizontal transporting mechanism extends by the channels on the first side of the warehouse while a reversible second horizontal transporting mechanism extends by the channels on the second side of the warehouse. At least one elevator is disposed on both the first and second sides of the warehouse adjacent to the respective horizontal transporting mechanism. The return channels make it possible to transport an item from the outlet end of a storage channel back to the inlet end along a loop located on the level of the storage channel. Thus, if an item to be shipped is disposed behind one or more other items which are to remain in storage, the latter items are simply conveyed along the respective loop.

9 Claims, 8 Drawing Sheets

FACILITY FOR STORING ITEMS ALONG PARALLEL CHANNELS

BACKGROUND OF THE INVENTION

The invention relates generally to a storage facility.

More particularly, the invention relates to a storage facility, e.g., a warehouse, having one or more levels each of which is provided with a series of parallel storage channels.

In a conventional facility of this type, one end of each channel constitutes an inlet for items to be stored. The items are admitted into the respective channel through such end and are stored in the channel until needed. The items are then removed from the channel via the other end thereof which constitutes an outlet for the items. The inlet ends of the channels are disposed at one side of the facility while the outlet ends are disposed at the opposite side of the facility. The facility has an admitting location where items are received by the facility and a withdrawing location where items are shipped from the facility. Transporting means are provided to move items from the admitting location to the storage channels and from the storage channels to the withdrawing location.

Such a facility, which is designed to function as a continuous storage facility, has many variations. In one form of storage facility, each of the storage channels is equipped with a track which is slightly inclined in a direction from the inlet end to the outlet end of the channel. Rolling carriages are movable along the tracks and carry the items or goods to be stored, e.g., stacked on pallets. Each rolling carriage, together with the pallet or pallets supported by the same and carrying the items or goods to be stored, constitutes a unit of stock. A conveyance receives such a unit of stock at the admitting location and brings the unit to the inlet end of a specific storage channel. Here, the unit of stock is introduced into the storage channel and travels along the same under the action of gravity until it runs up against the rearmost of the units of stock already in the channel. Upon removal of a unit of stock, a conveyance travels to the outlet end of the respective storage channel, receives the foremost unit of stock and brings this to the withdrawing location.

It is possible to provide the storage channels with conveyors, e.g., driven roller or chain conveyors, instead of tracks. The pallets are then loaded directly onto the conveyors.

Although such storage facilities have proved to be very satisfactory, they exhibit two significant drawbacks.

To begin with, they are not very suitable for relatively small numbers of each of a large assortment of goods. Thus, in a case of this type, it is necessary to provide a large number of relatively short storage channels. Since the foremost unit of stock is always taken when units are removed, each storage channel must be loaded with identical units of stock.

Second, in a conventional storage facility, the conveyance for the units of stock must make all trips between the central admitting and withdrawing locations. As a result, the conveyance must travel large distances and make numerous empty trips so that its capacity is very limited. This leads to delays in the storage and removal procedures.

SUMMARY OF THE INVENTION

It is an object of the invention to provide a storage facility which makes it possible to effectively manage a large variety of goods.

Another object of the invention is to provide a storage facility which is capable of handling a large number of each of a large assortment of goods with a relatively high degree of efficiency.

An additional object of the invention is to provide a storage facility which has the ability to effectively handle a large number of each of a large variety of goods yet can be relatively compact.

A further object of the invention is to provide a storage facility which makes it possible to increase the efficiency of transporting mechanisms for the goods.

Still another object of the invention is to provide a storage facility which enables the time required for the storage, removal and rearrangement of goods to be reduced.

One more object of the invention is to provide a storage facility of the type outlined above which can be relatively compact but is nevertheless capable of effectively handling a large number of each of a large assortment of goods and, in addition, makes it possible to reduce the time required for the storage, removal and rearrangement of goods.

An additional object of the invention is to provide a method which makes it possible to effectively manage a large variety of goods in a storage facility.

A concomitant object of the invention is to provide a method which enables a large number of each of a large variety of goods in a storage facility to be handled with a relatively high degree of efficiency.

Yet another object of the invention is to provide a method which allows a large number of each of a large assortment of goods to be effectively handled even in a relatively compact storage facility.

It is a further object of the invention to provide a method which permits the efficiency of the transporting mechanisms in a storage facility to be increased.

An additional object of the invention is to provide a method which makes it possible to reduce the time required for the storage, removal and rearrangement of goods in a storage facility.

The preceding objects, as well as others which will become apparent as the description proceeds, are achieved by the invention.

A storage facility, e.g., warehouse, according to the invention comprises a structure having at least one level and a plurality of first means on such level for directing items or goods along respective, substantially parallel first paths in a first direction. The first paths constitute storage channels for the items. The facility further comprises second means on the level for directing the items along a second path substantially parallel to the first paths in a second direction counter to the first direction. Means is provided for feeding the items to and removing the same from the various paths.

The paths may have neighboring first ends and neighboring second ends and the first direction may, for example, be the direction from the first ends towards the second ends. The feeding and removing means may include first transporting means adjacent to the first ends for shifting the items back-and-forth between the first ends and second transporting means adjacent to the second ends for shifting the items back-and-forth between the second ends. The first ends of the first paths may constitute inlets to the latter while the second ends of the first paths may constitute outlets from the same.

The feeding and removing means may also include third transporting means which functions to withdraw items from the second transporting means. In accordance with one embodiment of the invention, the third transporting means may additionally function to supply items to the second transporting means.

The facility may have an admitting location where items are received at the facility and a withdrawing location where items are shipped from the facility. The transporting means may be arranged to convey items from the admitting location to the different paths and from the latter to the withdrawing location.

The invention also encompasses a method of manipulating items in a storage facility. The method involves admitting the items into a first end of a first path having a second end spaced from the first end. The items are conveyed along the first path in a first direction and are stored in the first path. A first item is removed from the first path via the second end thereof and is admitted into one end of a second path having another end spaced from the one end. The first item is conveyed along the second path in a second direction counter to the first direction and is removed from the second path through the other end of the latter. A second item is removed from the first path via the second end thereof and is transported away from the first and second paths.

In accordance with a preferred embodiment of the method, the first item is readmitted into the first path through the first end of the same.

The novel features which are considered as characteristic of the invention are set forth in particular in the appended claims. The improved storage facility itself, however, both as to its construction and its mode of operation, together with additional features and advantages thereof, will be best understood from the following detailed description of certain specific embodiments when read in conjunction with the accompanying drawings.

DESCRIPTION OF THE PREFERRED EMBODIMENTS

Figure 1:
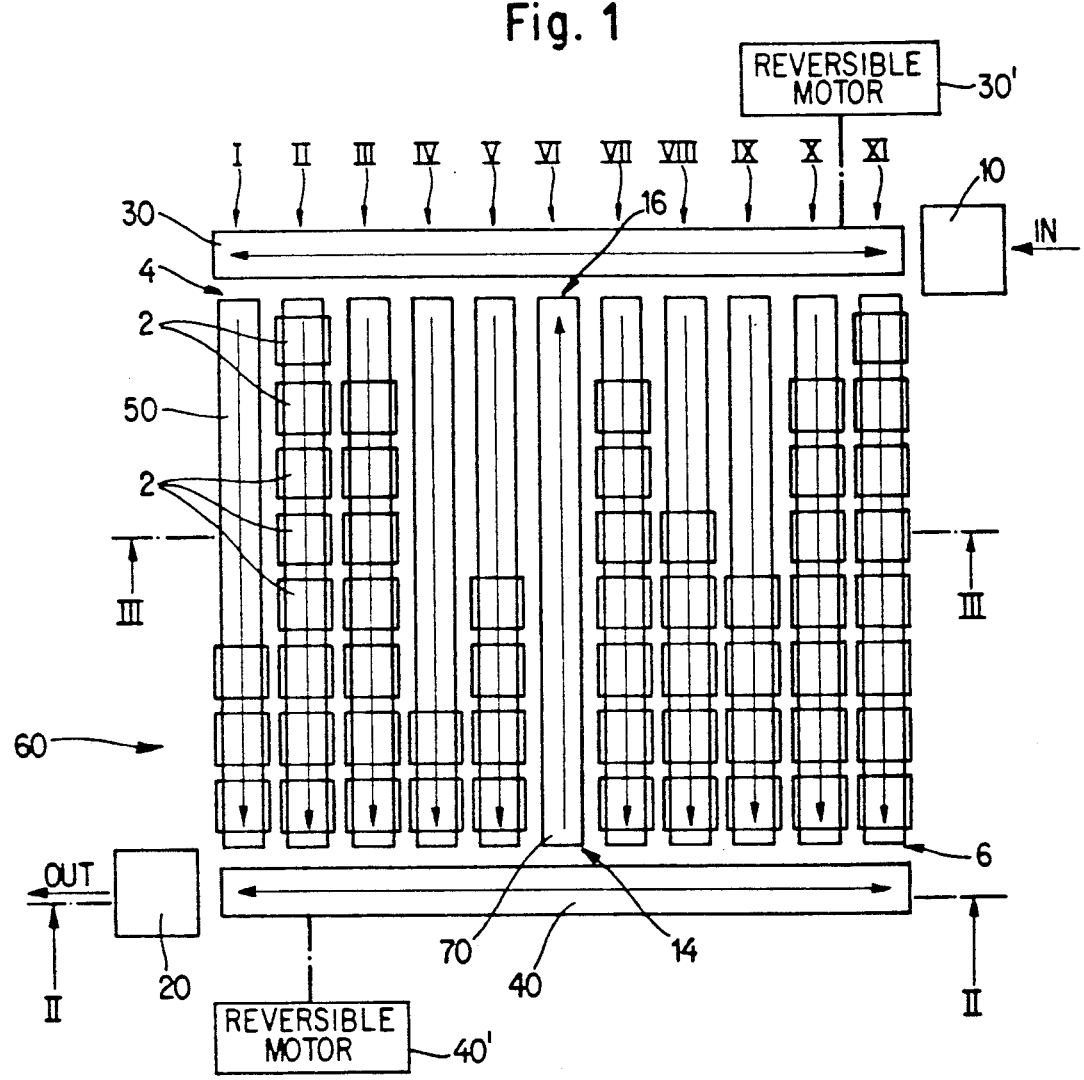
FIG. 1 is a schematic plan view of one level of a storage facility according to the invention.

FIG. 1 shows a storage facility or warehouse in accordance with the invention. The storage facility includes a structure 60 having several levels or stories and FIG. 1 represents a schematic plan view of one such level. The levels of the structure 60 are essentially horizontal and the upper surface of each level defines a substantially horizontal plane. The various levels are here assumed to be similar and the following description will refer to the illustrated level with the understanding that such description is generally applicable to all of the levels.

The illustrated level has ten paths I,II,III,IV,V,VII, VIII,IX,X,XI along which items 2 are conveyed and stored. The paths I-V,VII-XI may be considered to constitute storage channels for the items 2. The storage channels I-V,VII-XI are disposed next to one another and are parallel. Each of the storage channels I-V,VII-XI has an inlet end 4 through which the items 2 are introduced into the respective channel and an outlet end 6 via which the items 2 are withdrawn from the channel. The inlet ends 4 are arranged next to one another at one side of the structure 60 while the outlet ends 6 are located next to one another at the opposite side of the structure 60.

Each of the storage channels I-V,VII-XI is provided with a directing means 50 which functions to direct the items 2 along the corresponding channel in a direction from the inlet end 4 towards the outlet end 6 as indicated by the arrows in the storage channels. The directing means 50 for each storage channel I-V,VII-XI may be in the form of a rail or track which is mounted on the floor of the illustrated level and can serve as a guide for rolling carriages (see FIG. 2). Alternatively, each directing means 50 can be constituted by an overhead rail or track for suspended carriages. It is also possible for each directing means 50 to be in the form of a freewheeling or driven roller conveyor, or in the form of a driven belt conveyor or chain conveyor (see the motors 50' in FIG. 4).

When the directing means 50 are constituted by rails or freewheeling roller conveyors, the rails or roller conveyors are downwardly inclined in a direction from the inlet ends 4 to the outlet ends 6 of the storage channels I-V,VII-XI. Similarly, if the directing means 50 are in the form of driven roller, belt or chain conveyors, such conveyors are designed so that they can be driven in a sense to transport the items 2 in a direction from the inlet ends 4 towards the outlet ends 6.

The nature of the items 2 may depend upon the design of the storage channels I-V,VII-XI. For example, the items 2 may be constituted by units of stock such as containers of goods, rolling carriages carrying pallets loaded with goods, suspended carriages with goods hanging from the same, and so on.

The illustrated level further has an eleventh path VI along which the items 2 are conveyed. The path VI is disposed next to the storage channels I-V,VII-XI and extends parallel to the storage channels. As will be explained below, the path VI serves as a return channel for the items 2 and the latter are conveyed along such return channel in a direction counter to the direction of movement of the items 2 in the storage channels I-V,VII-XI. The direction of travel of the items 2 along the return channel VI is indicated by the arrow in the return channel VI. The return channel VI has an inlet end 14 through which the items 2 are admitted into the return channel VI and an outlet end 16 via which the items 2 are removed from the return channel VI. The inlet end 14 of the return channel VI is located next to the outlet ends 6 of the storage channels I-V,VII-XI whereas the outlet end 16 of the return channel VI is disposed next to the inlet ends 4 of the storage channels.

The return channel VI is provided with a directing means 70 which serves to direct the items 2 along the return channel VI in a direction from the inlet end 14 of the return channel VI to the outlet end 16, that is, in a direction counter to the direction of travel of the items 2 in the storage channels I-V,VII-XI. The directing means 70 may be identical to the directing means 50. Thus, the directing means 70 may be constituted by a track, i.e., at least one rail, which is mounted on the floor of the illustrated level and can function as a guide for rolling carriages (see FIG. 2). The directing means 70 may alternatively be in the form of an overhead rail or track for suspended carriages. It is further possible for the directing means 70 to be constituted by a free-wheeling or driven roller conveyor, or by a driven belt or chain conveyor (see the motor 70' in FIG. 4).

If the directing means 70 comprise a rail or roller conveyor, the rail or roller conveyor is downwardly inclined in a direction from the inlet end 14 of the return channel VI to the outlet end 16 thereof. This inclination, as considered from inlet end to outlet end, is opposite to that of a rail or roller conveyor provided in one of the storage channels I-V,VII-XI. If the directing means 70 is in the form of a driven belt, chain or roller conveyor, such conveyor is designed so that it can be driven in a sense to transport the items 2 in a direction from the inlet end 14 to the outlet end 16. The direction of movement of a driven belt, chain or roller conveyor forming part of the directing means 70 is thus opposite to that of a similar conveyor constituting part of a directing means 50.

When a directing means 50 or 70 is in the form of a driven belt, chain or roller conveyor, it is preferred for the conveyor to be designed such that it can be driven in a single direction only.

A driven transporting mechanism 30 extends by the inlet ends 4 of the storage channels I-V,VII-XI and the outlet end 16 of the return channel VI. As indicated by the double-headed arrow in the transporting mechanism 30, as well as the reversible motor 30', the transporting mechanism 30 is reversible. The transporting mechanism 30 is horizontally oriented and perpendicular to the channels I-XI. Transfer devices are provided on the transporting mechanism 30 and allow the same to remove items 2 from the return channel VI and deposit items 2 in the storage channels I-V,VII-XI. The transporting mechanism 30 may be in the form of a belt, roller or chain conveyor. However, it is also possible for the transporting mechanism 30 to include one or more driven carriages capable of travelling back-and-forth along a horizontal path which is perpendicular to the channels I-XI and adjacent to the inlet ends 4 and outlet end 16 (see the carriage 30" in FIG. 4).

A vertical transporting mechanism 10 is disposed at one end of the horizontal transporting mechanism 30. The vertical transporting mechanism 10 is situated next to an admitting location at which the items 2 are received by the storage facility. The admitting location is denoted by the label "IN". The vertical transporting mechanism 10 functions to deliver items 2 from the admitting location to the horizontal transporting mechanism 30. Items 2 carried by the vertical transporting mechanism 10 may be transferred to the horizontal transporting mechanism 30 via the transfer devices provided on the mechanism 30.

Another driven transporting mechanism 40 extends by the outlet ends 6 of the storage channels I-V,VII-XI and the inlet end 14 of the return channel VI. The double-headed arrow in the transporting mechanism 40, as well as the reversible motor 40', indicates that the transporting mechanism 40 is again reversible. The transporting mechanism 40 is horizontally oriented and perpendicular to the channels I-XI. Transfer devices are provided on the transporting mechanism 40 and enable the latter to deposit items 2 in the return channel VI and remove items 2 from the storage channels I-V,VII-XI. The transporting mechanism 40 may be in the form of a belt, chain or roller conveyor. It is further possible for the transporting mechanism 40 to include one or more carriages capable of travelling back-and-forth along a horizontal path which is perpendicular to the channels I-XI and adjacent to the outlet ends 6 and inlet end 14 (see the carriage 40" in FIG. 4).

A second vertical transporting mechanism 20 is arranged at one end of the horizontal transporting mechanism 40. The vertical transporting mechanism 20 is disposed next to a withdrawing location at which the items 2 are shipped from the storage facility. The withdrawing location is denoted by the label "OUT". The vertical transporting mechanism 20 serves to deliver items 2 from the horizontal transporting mechanism 40 to the withdrawing location. Items 2 may be transferred from the horizontal transporting mechanism 40 to the vertical transporting mechanism 20 by means of the transfer devices provided on the horizontal transporting mechanism 40.

Figure 2:
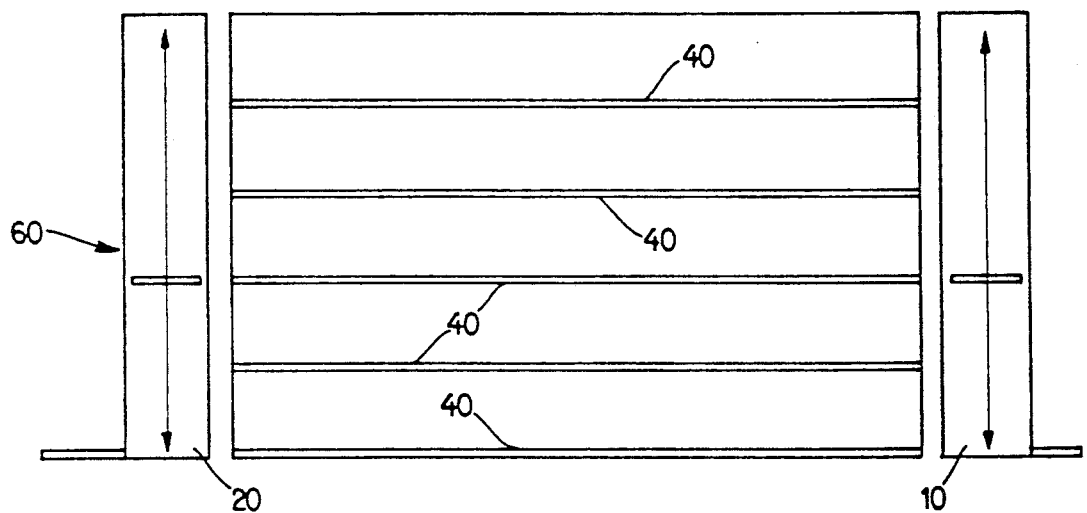
FIG. 2 is a schematic sectional view as seen in the direction of the arrows II—II of FIG. 1.
Figure 3:
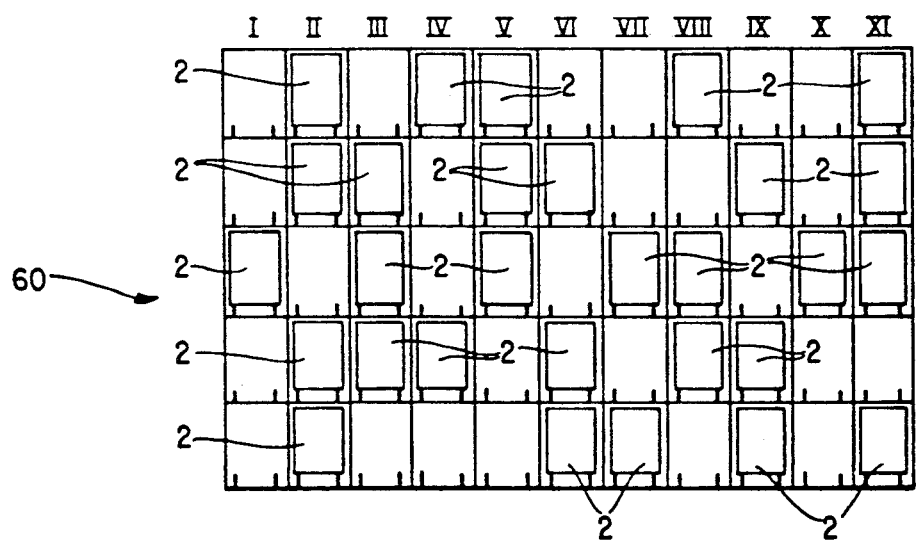
FIG. 3 is a schematic sectional view as seen in the direction of the arrows III—III of FIG. 1.

FIGS. 2 and 3 show that the illustrated storage facility has five levels. Each level has its own horizontal transporting mechanism 30 and its own horizontal transporting mechanism 40. On the other hand, the two vertical transporting mechanisms 10,20 respectively service all of the levels. This is particularly clear from FIG. 2 where each of the vertical transporting mechanisms 10,20 is shown as having a driven platform or elevator which, as indicated by the double-headed arrows, is movable up-and-down between all levels.

The operation of the storage facility will now be described with reference to FIGS. 4-15. Each of FIGS. 4-15 represents a schematic plan view of the same level of the facility and illustrates items which have been brought to the facility for storage.

Figure 4:
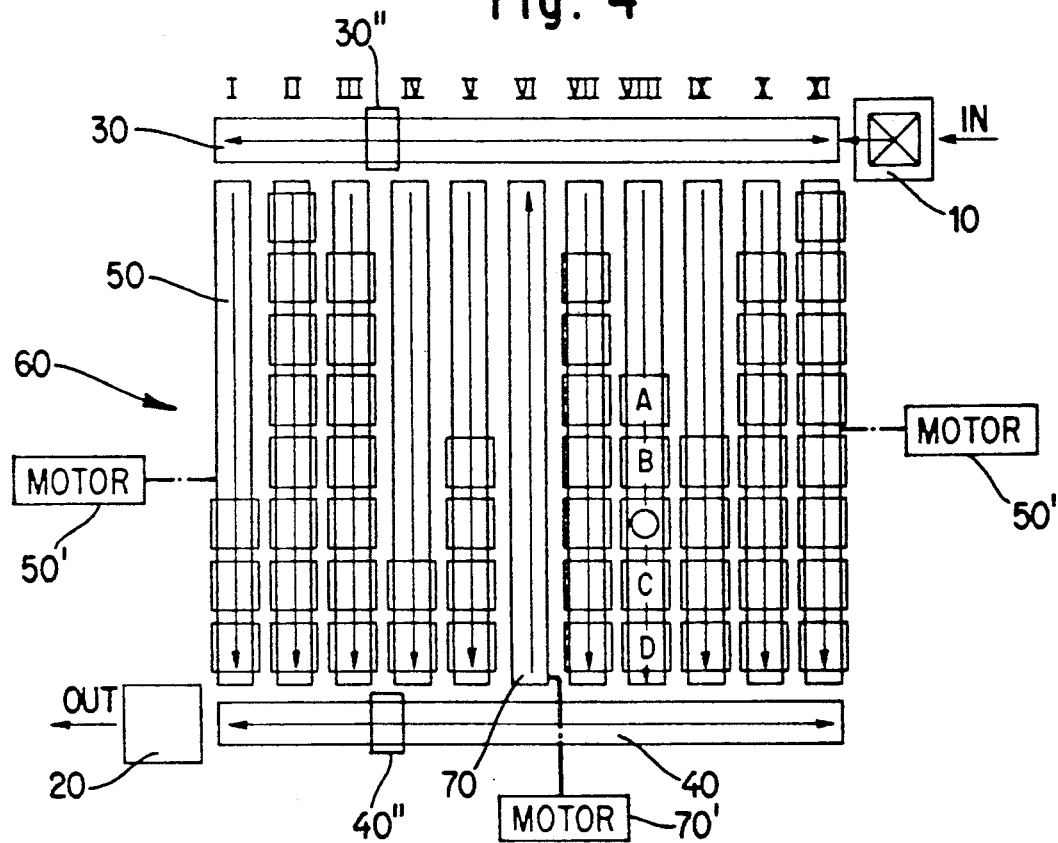
FIGS. 4–15 are views similar to FIG. 1 of another embodiment of the invention and illustrate different stages during the manipulation of items in the storage facility.

In FIG. 4, one of the items has been provided with a cross while another has been provided with a circle. Four additional items have been identified A,B,C and D, respectively. For ease of description, the item with the cross will hereinafter be referred to simply as "the cross" and the item with the circle as "the circle".

Beginning from the situation depicted in FIG. 4, the cross is to be placed in storage and the circle is to be removed from storage. The cross is in the vertical transporting mechanism 10 and has been brought to the illustrated level by the mechanism 10. On the other hand, the circle and items A-D are stored in the storage channel VIII. The circle, which is third in line in the storage channel VIII behind items D and C, is to be shifted into the vertical transporting mechanism 20 for transport to ground level and the withdrawing location of the storage facility.

Figure 5:
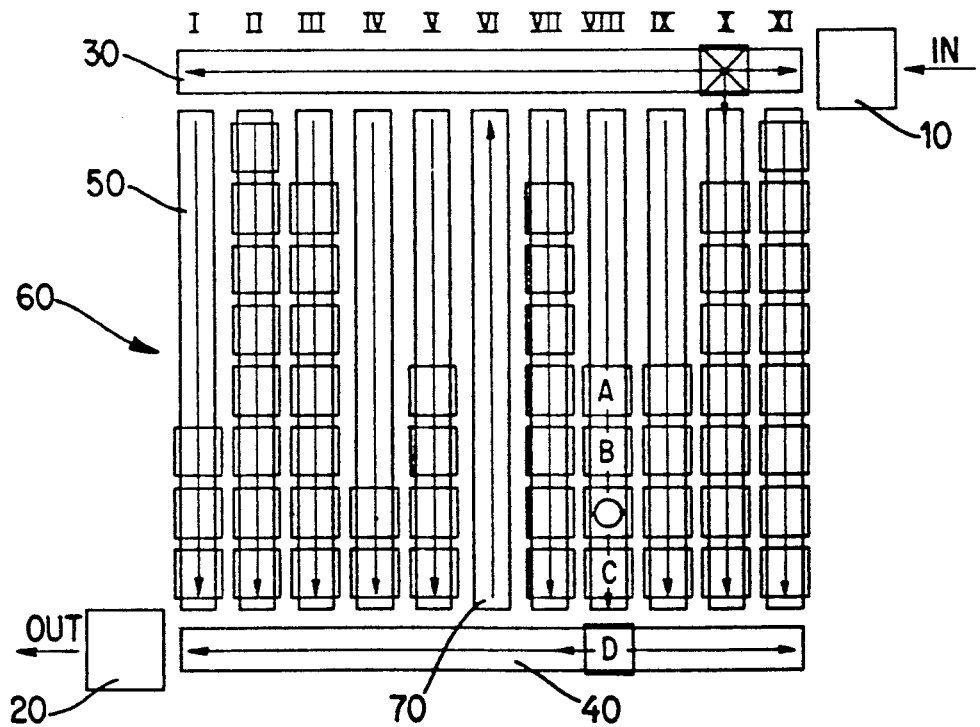

According to FIG. 5, the cross has been transferred from the vertical transporting mechanism 10 to the horizontal transporting mechanism 30 by a transfer device. The horizontal transporting mechanism 30 has shifted the cross to the left as seen in FIG. 5 so that it is positioned in front of the inlet end of the storage channel I-V,VII-XI which is nearest the vertical transporting mechanism 10 and has at least one free space at the inlet end thereof. In the present case, this is the storage channel X and the horizontal transporting mechanism 30 has positioned the cross in front of the inlet end of such storage channel.

As also shown in FIG. 5, the item nearest the outlet end, i.e., the foremost item, of the storage channel containing the circle has been transferred from such storage channel to the horizontal transporting mechanism 40 via a transfer device. In the illustrated embodiment where the circle is accommodated in the storage channel VIII and item D was the foremost item, item D has been transferred to the horizontal transporting mechanism 40.

Figure 6:
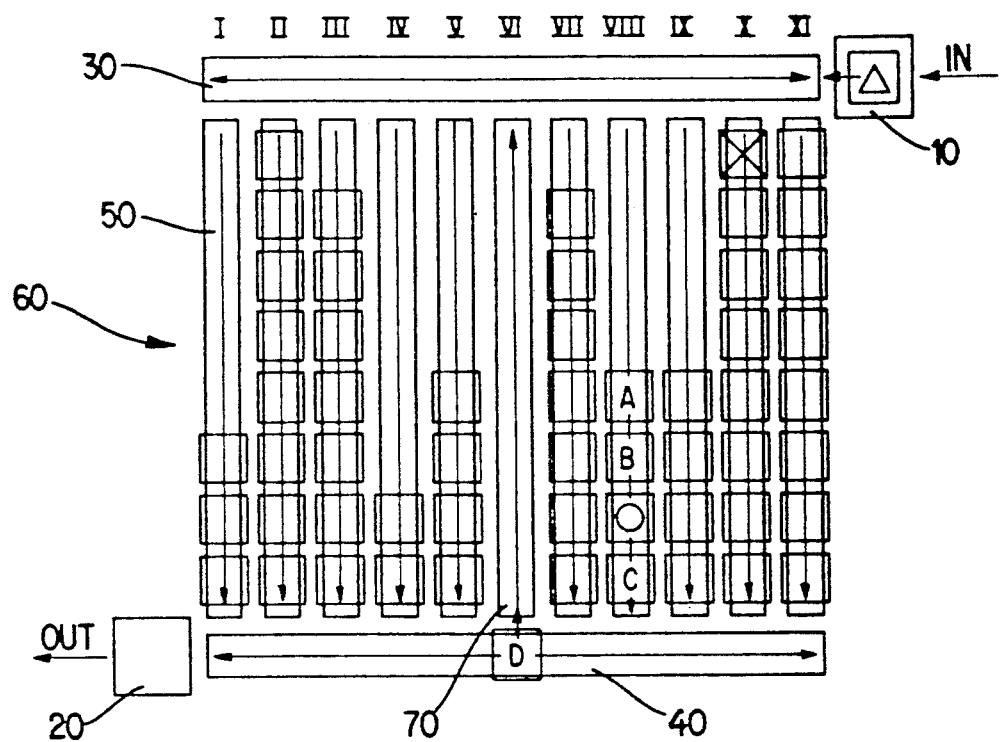

In FIG. 6, a transfer device has shifted the cross from its previous position in front of the inlet end of the storage channel X into the storage channel X. Meanwhile, the vertical transporting mechanism 10 has brought another item to the illustrated level for storage. This item, which is located in the vertical transporting mechanism 10, has been provided with a triangle and will hereinafter be referred to as "the triangle".

FIG. 6 further shows that item D which was removed from the storage channel VIII has been shifted from the outlet end of the latter to a position in front of the inlet end of the return channel VI. The items remaining in the storage channel VIII, namely, the circle and the items A,B,C, have been moved forward so that item C is now situated at the outlet end of the storage channel VIII.

Figure 7:
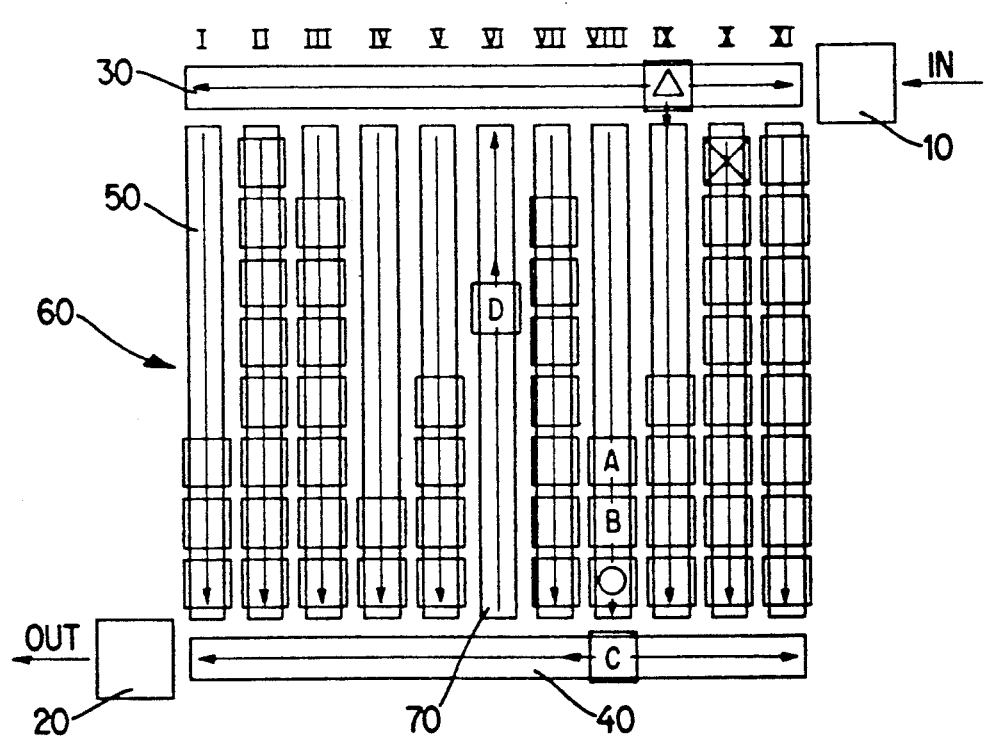

In accordance with FIG. 7, the triangle has been transferred from the vertical transporting mechanism 10 to the horizontal transporting mechanism 30 by means of a transfer device. Moreover, the horizontal transporting mechanism 30 has shifted the triangle to the left as seen in FIG. 7 so that it is situated in front of the inlet end of the storage channel I-V,VII-XI which is nearest the vertical transporting mechanism 10 and has at least one free space at the inlet end thereof. This is the storage channel IX and the triangle has been positioned in front of the inlet end of such storage channel.

Meanwhile, as also shown in FIG. 7, a transfer device has moved the foremost item in the storage channel VIII, that is, item C which was at the outlet end of the storage channel VIII, onto the horizontal transporting mechanism 40. The latter then conveys item C in a direction towards the return channel VI. Upon removal of item C from the storage channel VIII, the circle shifts to the outlet end of the channel VIII and assumes the foremost position in the channel.

FIG. 7 additionally illustrates that item D, which was previously positioned in front of the return channel VI, has been transferred into such channel and is travelling along the same towards the outlet end of the return channel VI.

Figure 8:
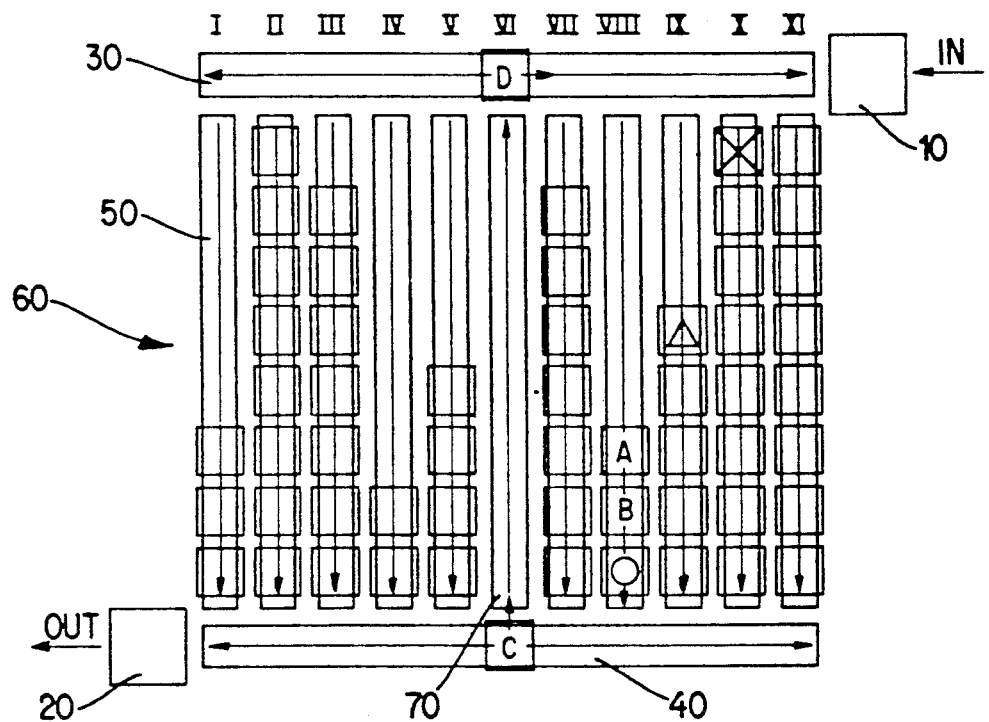

In FIG. 8, a transfer device has shifted the triangle from the horizontal transporting mechanism 30 into the storage channel IX and the triangle has travelled along the channel IX so that it is adjacent to the items already stored in this channel. Furthermore, item D has been transferred from the return channel VI to the horizontal transporting mechanism 30 which conveys item D in a direction towards the inlet end of the storage channel VIII. Item C has been brought to a position in front of the inlet end of the return channel VI by the horizontal transporting mechanism 40 and is ready to be moved into the return channel VI.

Figure 9:
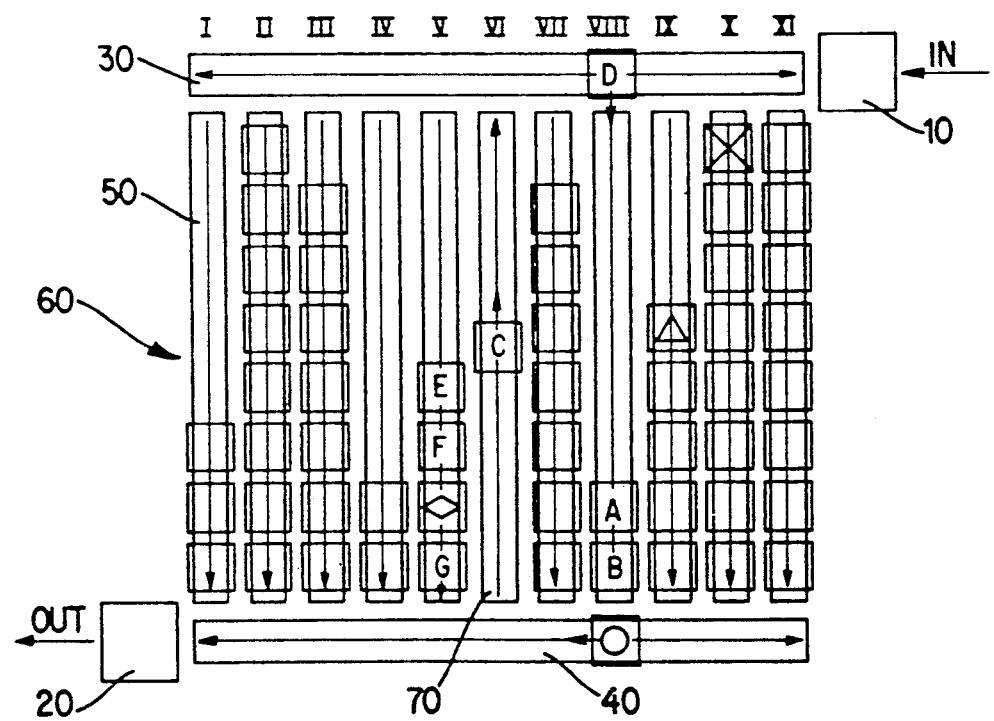

FIG. 9 shows that item D is now situated in front of the inlet end of the storage channel VIII in preparation for transfer into the channel VIII. In addition, the circle, which had earlier assumed the foremost position in the storage channel VIII, has been shifted onto the horizontal transporting mechanism 40. The latter conveys the circle towards the vertical transporting mechanism 20. Upon removal of the circle from the storage channel VIII, item B moves to the foremost position in the channel VIII.

As also illustrated in FIG. 9, item C has been transferred to the return channel VI and is travelling along the same in a direction towards the horizontal transporting mechanism 30.

FIG. 9 further shows three items labeled E,F and G, respectively, and an additional item provided with a diamond. The latter will hereinafter be referred to simply as "the diamond".

Items E,F,G and the diamond are stored in the storage channel V with item G in the foremost position and the diamond in the second position. It is assumed that the diamond is to be shipped from the storage facility so that it must be withdrawn from the storage channel V. Since the diamond is behind item G, it is necessary to first reposition item G.

Figure 10:
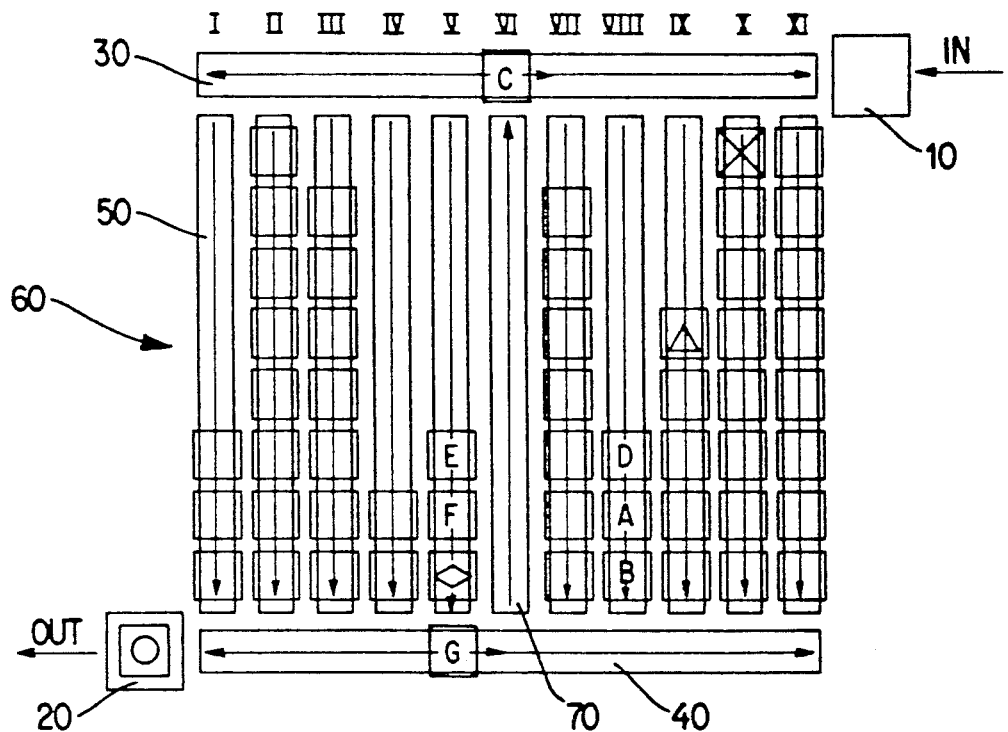

Referring to FIG. 10, item D has been transferred from the horizontal transporting mechanism 3 to the storage channel VIII and has moved adjacent to items A and B which still remain in the channel VIII. Moreover, item C has been shifted from the return channel VI to the horizontal transporting mechanism 30 which conveys item C in a direction towards the inlet end of the storage channel VIII. The circle has been moved onto the vertical transporting mechanism 20 and the latter carries the circle to ground level and the withdrawing location of the storage facility. In addition, the foremost item in the storage channel V, namely, item G, has been transferred to the horizontal transporting mechanism 40 which transports item G in a direction towards the inlet end of the return channel VI. The diamond moves to the foremost position in the storage channel V when item G leaves such channel.

Figure 11:
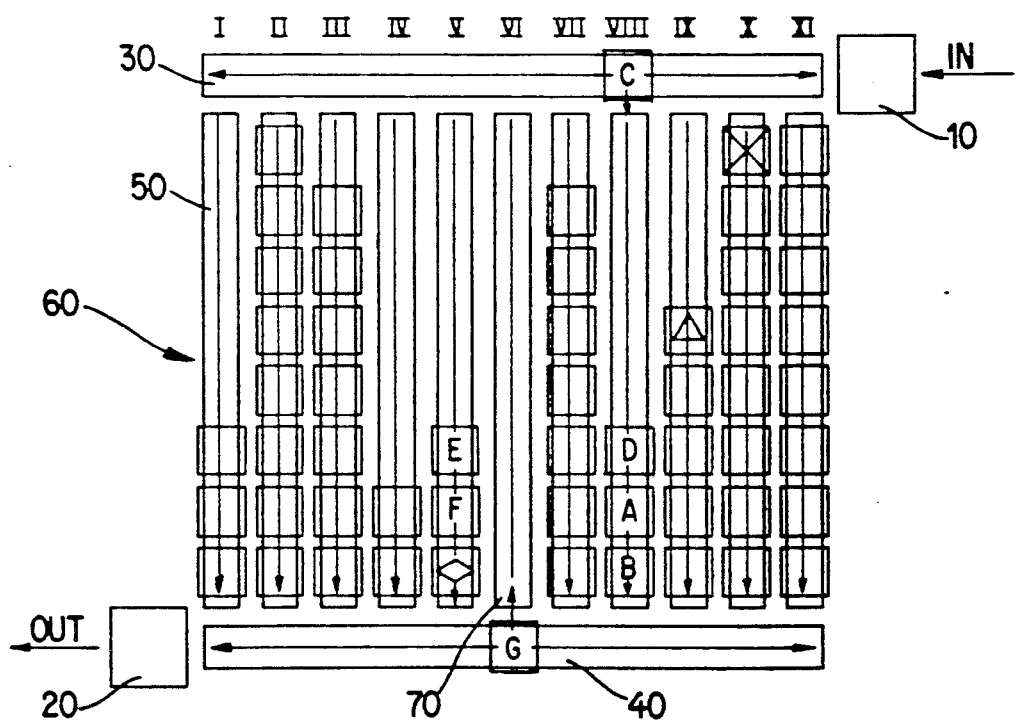

In accordance with FIG. 11, item C has been positioned in front of the inlet end of the storage channel VIII for transfer into the channel VIII. Furthermore, item G has been placed in front of the inlet end of the return channel VI preparatory to being shifted into the latter. The diamond, which is to be shipped from the storage facility and, as already mentioned, has assumed the foremost position in the storage channel V, is now next in line to be removed from the channel V.

Figure 12:
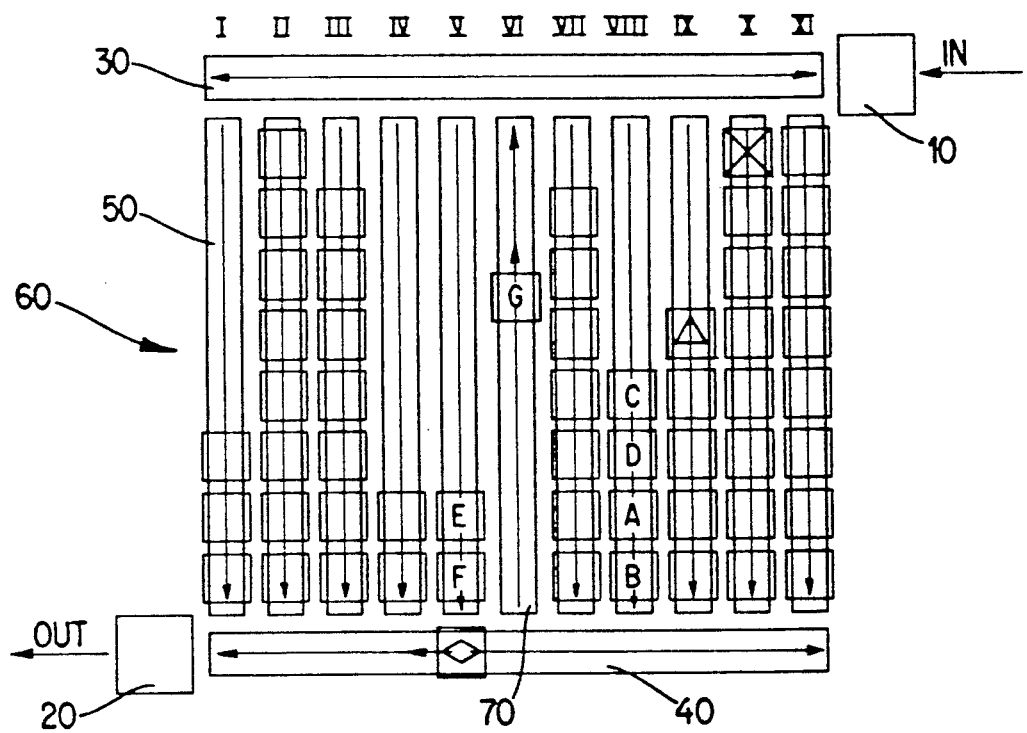

FIG. 12 shows that item C has been transferred from the horizontal transporting mechanism 30 into the storage channel VIII and has travelled along the channel VIII so that it is adjacent to items A,B and D which are stored in such channel. This completes the removal and rearrangement procedures involving the storage channel VIII. In the meantime, item G has been shifted into the return channel VI by the horizontal transporting mechanism 40 and is moving through the return channel VI in a direction towards the horizontal transporting mechanism 30. The diamond has been shifted from the storage channel V to the horizontal transporting mechanism 40 which conveys the diamond towards the vertical transporting mechanism 20. Upon removal of the diamond from the storage channel V, item F assumes the foremost position in the channel V.

Figure 13:
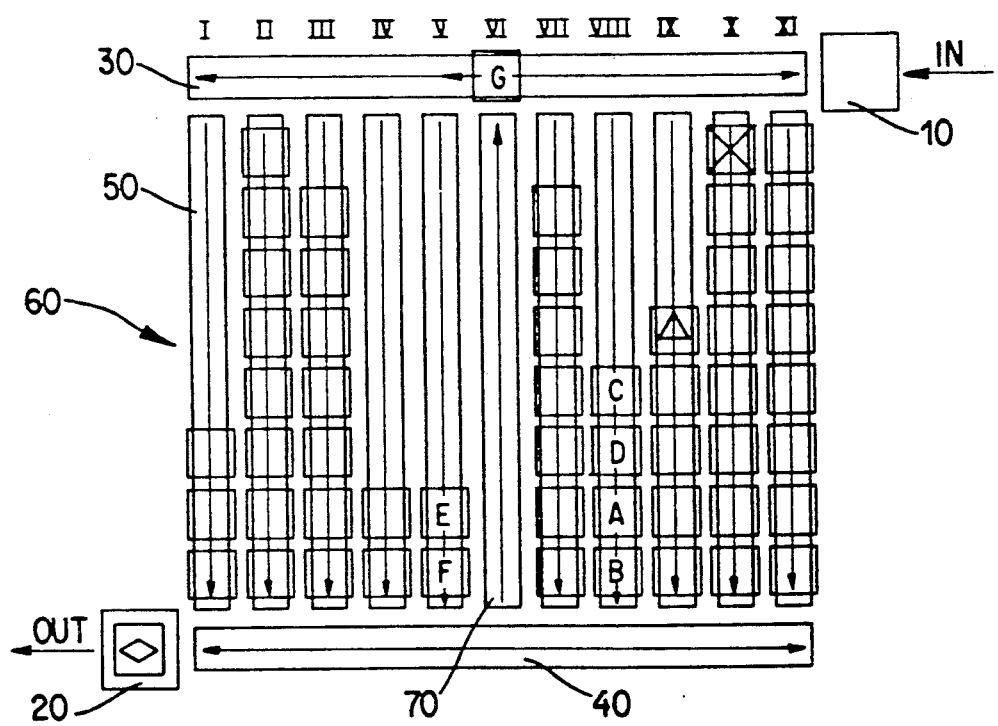

According to FIG. 13, item G has been transferred from the return channel VI to the horizontal transporting mechanism 30. The mechanism 30 transports item G towards the inlet end of the storage channel V. Furthermore, the diamond has arrived at the vertical transporting mechanism 20 which brings the diamond to ground level and the withdrawing location of the storage facility.

Figure 14:
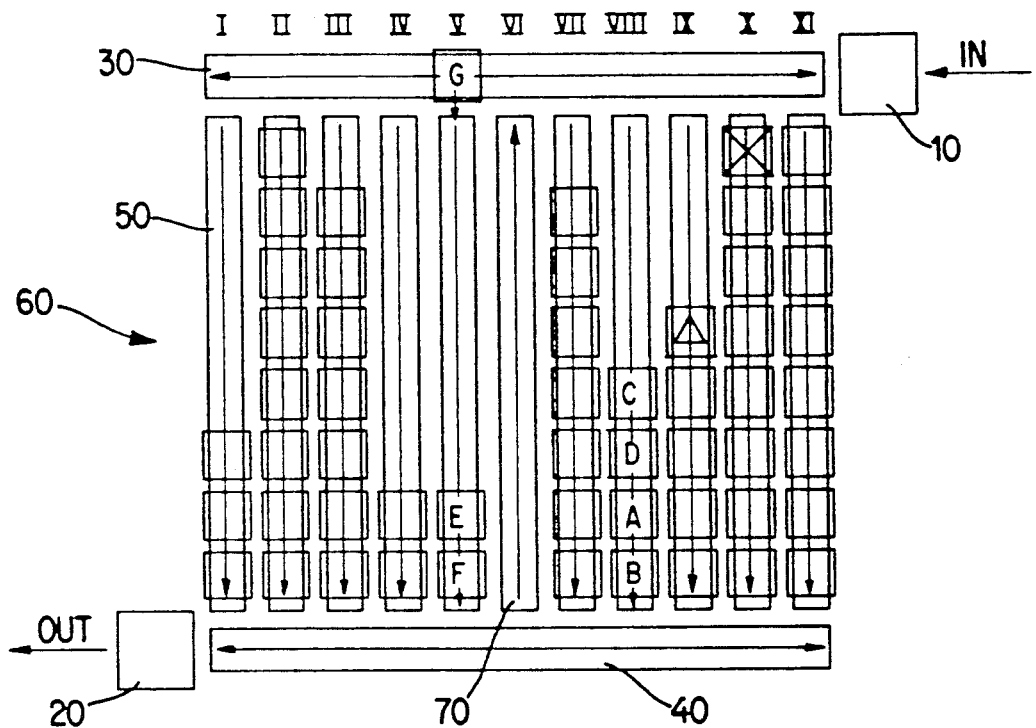

In FIG. 14, item G has assumed a position in front of the inlet end of the storage channel V. The horizontal transporting mechanism 30 now shifts item G into the channel V.

Figure 15:
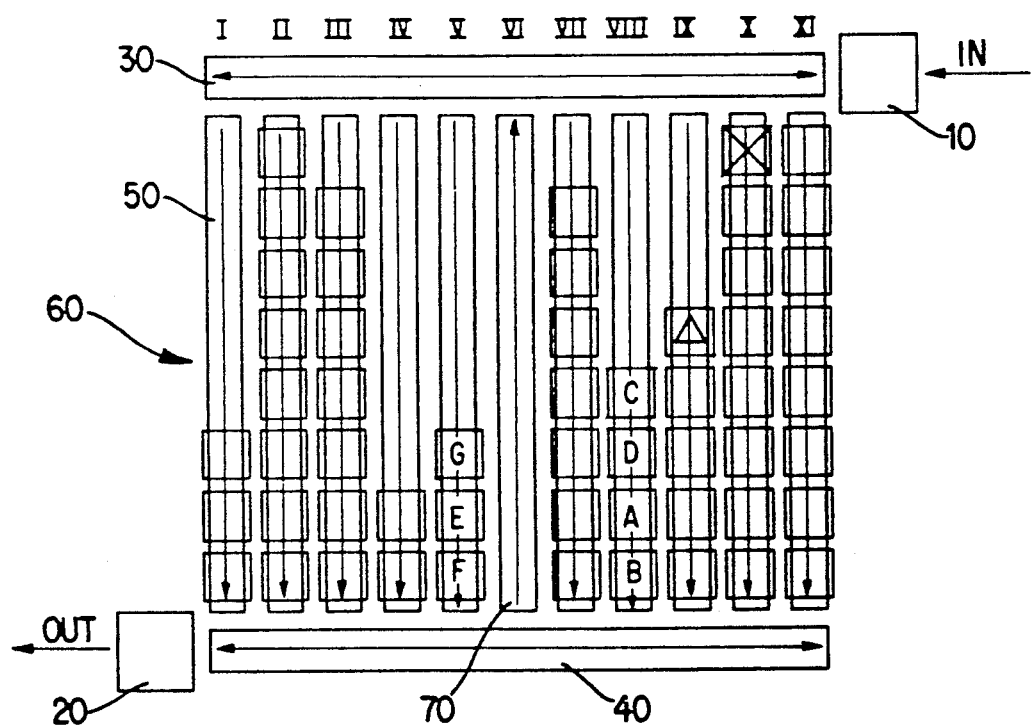

FIG. 15 shows that item G has travelled along the storage channel V so that it is positioned next to the items E and F stored in this channel.

It is possible to have more than one vertical transporting mechanism 10 and/or more than one vertical transporting mechanism 20.

It is further possible to eliminate the vertical transporting mechanism 10. In such an event, the vertical transporting mechanism 20 assumes both the function of bringing items to be stored from the admitting location to the horizontal transporting mechanism 40 and the function of taking items to be shipped from the horizontal transporting mechanism 40 to the withdrawing location. The general course of the storing and removing procedures is principally the same as described above. The main difference is that an item arriving at any level is first brought to the return channel VI by the horizontal transporting mechanism 40 and then transported through the channel VI to the horizontal transporting mechanism 30 which conveys the item to the inlet end of a storage channel I-V,VII-XI having a free space.

Conventional storage facilities have one or two transporting mechanisms which do all of the travelling between the admitting and withdrawing locations and the storage channels. Accordingly, the capacities of the transporting mechanisms in conventional storage facilities are very limited. In contrast, the storage facility according to the invention is equipped with a multiplicity of transporting mechanisms. For example, a continuous storage facility in accordance with the invention having six levels is provided with a total of fourteen transporting mechanisms, namely, two horizontal transporting mechanisms per level and two vertical transporting mechanisms which service all levels.

An item required for an order, e.g., a rolling carriage supporting one or more pallets loaded with goods, need not be at the foremost location of a storage channel. If it is not, the items in front of the required item are removed from the storage channel via the front end thereof and are again loaded into the channel at the other end. The removal and loading of items on a given level are carried out by the respective horizontal transporting mechanisms so that the vertical transporting mechanisms are free to perform other transfer functions.

The transporting technique can be adjusted in such a manner that a complete rearrangement of the storage facility, that is, of the stored items, can be accomplished within a specific time interval, e.g., within twenty-four hours. This allows all of the chaotically stored goods to be inventoried in such time interval.

The admitting or receiving location and the withdrawing or shipping location are preferably provided with entry and exit buffers, respectively. Loading and unloading of the vertical transporting mechanisms can normally be carried out by transfer devices disposed externally of the transporting mechanisms. Where controlled operation is required, the horizontal transporting mechanisms can, as above, be provided with transfer devices. Alternatively, an incline can be used to effect transfer to and from the horizontal transporting mechanisms.

The storage facility according to the invention provides a technically simple, reliable and financially attractive means for storing a wide variety of goods in large numbers. The sequence in which items are stored need not be the same as the sequence in which items are removed. In addition, very short return distances and times can be realized.

When a storage facility has a large number of storage channels per level, it can be of advantage to provide each level with a plurality of return channels instead of only one such channel. In the extreme where an extraordinarily large number of storage and removal procedures are anticipated, each storage channel can be associated with a return channel which is located next to the respective storage channel so that the stored items essentially circulate along a closed path. The number of return channels is preferably at most equal to the number of storage channels.

The vertical transporting mechanism 10 can be designed to carry one or more items for each level of the storage facility at one time. The same applies for the vertical transporting mechanism 20. This allows the number of trips made by the vertical transporting mechanism 10 and/or the vertical transporting mechanism 20 to be reduced.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A storage facility, comprising a structure having a plurality of vertically superimposed levels; first means on each level for directing items along a plurality of substantially parallel first paths exclusively in a first direction, the first paths of each level being arranged side-by-side horizontally and constituting a first group of storage channels for the items; second means on each level for directing items along a plurality of second paths substantially parallel to the first paths exclusively in the first direction, the second paths of each level being arranged side-by-side horizontally and constituting a second group of storage channels for the items; third means on each level for directing items along a third path substantially parallel to the respective first and second paths exclusively in a second direction counter to the respective first direction, the third path of each level being disposed between the respective first and second groups in horizontal direction; and means for feeding the items to and removing the items from the paths, the first, second and third paths of each level having neighboring first ends and neighboring second ends, and said feeding and removing means including reversible first transporting means for directing items on each level movable substantially horizontally adjacent to the respective first ends transversely of the respective paths, reversible second transporting means for directing items on each level movable substantially horizontally adjacent to the respective second ends transversely of the respective paths, and elevator means for moving the items up-and-down between levels and for supplying items to and removing items from the first and/or second transporting means on each level, the first transporting means of each level being movable along a predetermined path which extends by each of the first, second and third paths of the respective level, and the path of each of said first transporting means having an end defining a third end. the second transporting means of each level being movable along another predetermined path which extends by each of the first, second and third paths of the respective level, and the path of each of said second transporting means having an end defining a fourth end, said elevator means including an elevator adjacent to said third ends or said fourth ends.

2. The facility of claim 1, wherein the first ends of said first paths constitute inlets to the latter and the second ends of said first paths constitute outlets from the latter.

3. The facility of claim 1, wherein said elevator is a first elevator and is adjacent to said third ends and said elevator means further includes a second elevator adjacent to said fourth ends.

4. The facility of claim 1, wherein each of said first transporting means comprises a driven, reversible belt, roller or chain conveyor.

5. The facility of claim 1, wherein each of said first transporting means comprises a driven, reversible carriage.

6. The facility of claim 1, wherein each of said second transporting means comprises a driven, reversible belt, roller or chain conveyor.

7. The facility of claim 1, wherein each of said second transporting means comprises a driven, reversible carriage.

8. The facility of claim 1, wherein said first means comprises a belt, roller or chain conveyor for each of said first paths.

9. The facility of claim 1, wherein said second means comprises a belt, roller or chain conveyor for each of said second paths.

* * * * *